Oct. 31, 1939.  A. L. FREEDLANDER  2,178,421
RUBBER ROLL
Filed Sept. 30, 1936
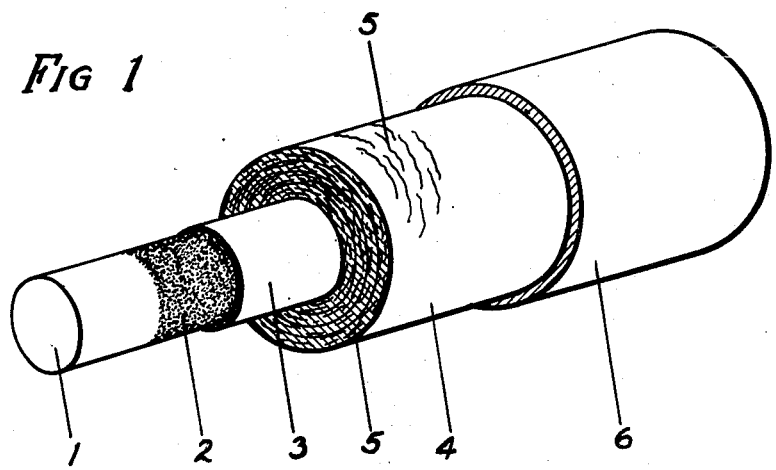
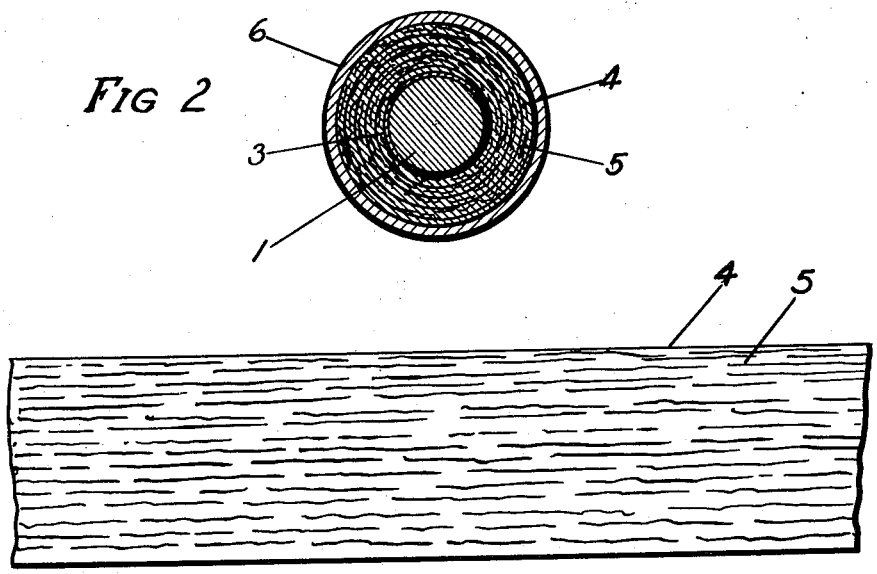
INVENTOR
ABRAHAM L. FREEDLANDER
BY
ATTORNEYS Patented Oct. 31, 1939

2,178,421

UNITED STATES PATENT OFFICE 2,178,421

RUBBER ROLL

Abraham L. Freedlander, Dayton, Ohio, assignor to The Dayton Rubber Manufacturing Company, Dayton, Ohio, a corporation of Ohio Application September 30, 1936, Serial No. 103,417

7 Claims. (Cl. 91—67.8)

My invention relates to printers' rollers.

It is the object of my invention to provide a printer's roller particularly adaptable as a hard impression roller.

It is a further object to provide a roller that has the property of not absorbing the ink materials nor the clean-up materials for cleaning off the ink, and has the property of protecting the rubber against deterioration and swelling, even though the roller is made of rubber that is normally sensitive to such materials.

It is an object to provide a printing medium of resilient material having fibers mixed therein which resist impressions made by the type and which resist deformation of the medium so as to provide a sharp line contact between the medium and the type or printed surface without deformation.

Referring to the drawing:

Figure 1 is a perspective showing the successive treatments and layers of material to form the completed roller. The dimensions are necessarily exaggerated in order to diagrammatically illustrate the relationship of the several parts of the roller.

Figure 2 is a section taken transversely through the roller.

Figure 3 is an enlarged diagrammatic view in elevation showing the arrangement of the fibers in the rubber, running longitudinally of the rubber sheet and in the direction of winding of the sheet.

Referring to the drawing in detail, 1 is a steel axle having a sand-blasted surface as at 2. A rubber cement 3 is then coated upon the sand-blasted surface. There is then wound upon this cemented surface one or more layers of rubber having a plurality of longitudinally-disposed fibers, all running in the same direction and lying horizontally in the direction of the winding of the sheet. This rubber is designated 4, and the fibers are designated 5. If the roller is to be completed at this point, then it is vulcanized by any one of the usual processes for this purpose.

While rubber normally is sensitive to oils, greases, inks and clean-up materials for cleaning ink from printing surfaces, yet I have found that the life of rubber under such circumstances is sufficient to give a satisfactory performance for a printing roller, if there is incorporated in the rubber a large proportion of horizontally-disposed fibers in the rubber. In the trade this material is referred to as "stiflex." I have discovered it has the property of not absorbing the ink materials and of protecting the rubber against swelling and deterioration. It also provides a relatively hard impression roller with sufficient body and hardness to be satisfactory for various purposes where hard rollers are desired. The uniformity of the texture of the rubber, by reason of the uniformity of disposition of the fibers, makes it possible to produce a superior, uniform printing result, and to provide a roller of relatively long life, despite the fact that it is made of rubber.

However, when it is desired to have an extremely hard impression roller or one that is extremely resistant to inks and the like, I then provide a sleeve of resilient material that is inert to ink-cleaning materials, inks, greases and the like. This sleeve is designated 6. The roller is not vulcanized until the sleeve is applied, and then the entire structure is vulcanized at one time.

The outer sleeve may be made of such materials as "Duprene", "Thiokol", or other synthetic rubbers or resins having the property of a smooth, hard surface that is capable of acquiring a tack, and the further property of being inert to oils, greases, etc.

In order to control the hardness of this thin sleeve 6, I add clays, whitings, and the like, or equivalent mineral fillers, in order to give body and hardness. The degree of hardness will determine the proportions of these mineral ingredients. A typical roller which I have found to be satisfactory in practice is one having 80% mineral filler in the sleeve 6, and 20% of a synthetic rubber material.

The Shore readings vary from 80 to 90 degrees. The sleeve should vary between these limits as to its hardness according to the uses to which it is to be put.

When the vulcanization takes place, it is preferably by the hot water process. A typical hot water cure is the immersion of the roller in hot water under pressure, with the temperature of the water from 250 to 260 degrees and the pressure from 150 to 200 pounds. The approximate period of time for a roller to be kept in the water varies hours.

It will be further understood that the same principle embodied in this invention may be carried out by imbedding the fibers 5 in the manner described in the sleeve 6, thereby taking the place of the mineral fillers.

It will be understood that I desire to comprehend within my invention such modifications as may be necessary to adapt it to varying conditions and uses.

Having thus fully described my invention, what I claim as new and desire to secure by Letters Patent, is:

1. A new article of manufacture for use as a printing roller comprising a rigid axle and a vulcanized body of rubber mounted thereon and fixed thereto having a plurality of longitudinally disposed textile fibers therein arranged in parallelism running in the same direction circumferentially of the roller, said fibers being uniformly distributed throughout the body of the rubber to provide a printing roller which resists deformation by the type and produces a sharp line contact between the medium and the type.

2. A new article of manufacture for use as a printing roller comprising a metal axle, a wound rubber body mounted thereon and adherent thereto having a plurality of unspun fibers lying therein horizontally and parallel to the direction of winding of the rubber body on the axle, said fibers being uniformly distributed throughout the rubber body, and a sleeve of resilient material vulcanized thereover, said sleeve being inert to oils, greases, and ink-cleaning materials.

3. A new article of manufacture for use as a printing roller comprising a metal axle, a rubber body mounted thereon having incorporated therein a plurality of fibers lying horizontally in the direction of winding of the rubber body on the axle and a sleeve of resilient material comprising mineral filler and synthetic rubber vulcanized thereon, said sleeve being inert to oils, greases and ink-cleaning materials and of a hardness ranging by a Shore reading from 80 to 90 degrees.

4. In combination, in a printing roller, a metal axle having a sand-blasted surface with a rubber cement coating thereon, a wound sheet of rubber with a plurality of textile fibers arranged horizontally therein in the direction of winding of the sheet, and a relatively thin sleeve covering the rubber body, said sleeve being composed of moldable material comprising synthetic rubber which is inert to oils, greases and ink-cleaning materials.

5. In combination, a metal axle having a sand-blasted surface with a rubber cement coating thereon, a wound sheet of rubber with embedded unspun textile fibers horizontally disposed in the direction of winding, and a relatively thin sleeve covering the rubber body, said sleeve being composed of synthetic rubber resinous and filler material which provides an outer covering inert to oils, greases and ink-cleaning materials and having a substantial amount of mineral filler to produce a hard impression roller of a Shore reading of from 80 to 90 degrees.

6. In a printing roller, the combination of relatively soft resilient rubber covering wound upon an axle, the surface of which has been roughened, said wound rubber covering having a plurality of longitudinally disposed textile fibers distributed horizontally in said rubber body and arranged in the direction of the winding of said rubber covering, and a sleeve of resilient synthetic rubber applied thereover, said sleeve consisting of approximately 80 per cent mineral filler and 20 per cent synthetic rubber by weight.

7. In a printing roller, the combination of a metal axle having a roughened surface, a relatively soft resilient rubber sheet wound upon said axle and cemented thereto, said wound rubber sheet having a plurality of textile fibers distributed throughout the rubber mass and arranged longitudinally in the direction of the winding of said sheet, and a sleeve of resilient synthetic resinous material disposed thereover comprising approximately 80 per cent by weight of filler, the whole being vulcanized to a resilient unitary roller.

ABRAHAM L. FREEDLANDER.